United States Patent [19]

Kokuta et al.

[11] Patent Number: 5,234,631

[45] Date of Patent: Aug. 10, 1993

[54] FIREPROOF OR REFRACTORY MATERIALS CONTAINING FIRE-RESISTANT, WATER SOLUBLE, FILM-FORMING INORGANIC COMPOUNDS

[75] Inventors: Naoto Kokuta, Himeji; Kenji Kokuta, Chigasaki; Katsuhiro Kokuta, Chigasaki; Hiroshi Kokuta, Chigasaki, all of Japan

[73] Assignee: Kohmix Co., Ltd., Kanagawa, Japan

[21] Appl. No.: 693,480

[22] Filed: Apr. 30, 1991

Related U.S. Application Data

[62] Division of Ser. No. 365,112, Jun. 12, 1989, Pat. No. 5,049,316.

[30] Foreign Application Priority Data

| Jun. 10, 1988 | [JP] | Japan | 63-144397 |
| Jun. 10, 1988 | [JP] | Japan | 63-144398 |
| Jun. 10, 1988 | [JP] | Japan | 63-144399 |

[51] Int. Cl.$^5$ ............... C09K 21/02; C09D 5/16; C01B 35/10; C01B 33/08
[52] U.S. Cl. ............... 252/602; 252/610; 106/18.12; 106/18.13; 423/277; 423/341; 423/332
[58] Field of Search ............... 423/322, 341, 116, 202, 423/208, 277; 252/602, 610

[56] References Cited

U.S. PATENT DOCUMENTS

| 2,447,359 | 8/1948 | Oakley | 423/332 |
| 3,488,702 | 1/1970 | Giraitis et al. | 423/332 |
| 3,503,765 | 3/1970 | Blaze | 423/332 |
| 3,870,532 | 3/1975 | Biegler et al. | 423/332 |
| 4,088,621 | 5/1978 | Miller | 423/332 |
| 4,154,620 | 3/1979 | Miller | 423/341 |
| 4,362,703 | 12/1982 | Boybay et al. | 423/116 |
| 4,693,878 | 9/1987 | Skaria et al. | 423/332 |
| 4,824,807 | 4/1989 | Blount | 423/332 |
| 5,049,316 | 9/1991 | Kokuta et al. | 252/602 |

Primary Examiner—Richard D. Lovering
Assistant Examiner—Joseph D. Anthony
Attorney, Agent, or Firm—Wenderoth, Lind & Ponack

[57] ABSTRACT

Water-soluble film-forming inorganic compounds having a specific gravity of 1.1 or more and capable of being formed into a film at ordinary temperature or by heating. The compounds are formed by a reaction of a metal, a hydroxide of an alkali metal, and hydrofluoric acid or boric acid and their salts or their submineral acid salts. The water-soluble film-forming inorganic compounds are superior in refractory, heat-resistant and heat-insulating properties, also have rust-inhibitory properties. The compounds are useful as heat-resistant adhesives in fireproof and heat-resistant layered composites made of metal, wood, and the like. A process of coating materials with a layer of these compounds is also provided.

5 Claims, 3 Drawing Sheets

Heating time-Temperature of steel materials (Three hours)

FIREPROOF OR REFRACTORY MATERIALS CONTAINING FIRE-RESISTANT, WATER SOLUBLE, FILM-FORMING INORGANIC COMPOUNDS

This is a divisional application of U.S. Ser. No. 07/365,112, filed Jun. 12, 1989 now U.S. Pat. No. 5,049,316.

BACKGROUND OF THE INVENTION

1. Field of the Invention

Film-forming inorganic compounds capable of being formed into flexible materials such as the compounds of the present invention have extensive industrial uses, for example, as coatings for paper, fiber, cloth, and the like. Further, these compounds may be used as flame and heat-resistant agents when incorporated into glass to raise the melting point thereof, and when used to impregnate wood products to raise the kindling point thereof; as rust inhibitive coatings; as refractory adhesives for ceramics; etc.

Moreover, the present invention relates to fireproof and fire-resistant composites, and to refractory flexible sheet composite covering materials for use in the interior of very tall buildings, and to heat-resistant, heat-insulative and sound-insulative materials for use in motor vehicles, ships, and the like. The invention also relates to a fire-resistant-covering process using these composite materials.

2. Description of the Prior Art

Sodium silicate has been used as an inorganic adhesive and coating material but has disadvantages, for example, it is hydroscopic, becomes carbonized easily and turns white, solidifies quickly and develops cracks, and tends to peel. Fluoride materials can be added to these coating materials to improve water-proofness, but this is not always sufficiently effective.

Silica sol and silica alkoxide are commercially available compounds. These compounds by themselves have no film-forming properties, but they may be modified by the addition of an organic compound to impart film-forming properties in materials. However, such modified materials fail to attain high temperature resistant and refractory properties. Teflon, a synthesis product of freon and an organic compound, has good heat resistance when compared with general synthetic resins, but is not qualified as a refractory.

There have been proposed, in U.S. Pat. Nos. 4,117,088, 4,029,747, 4,117,099 and Japanese Unexamined Patent Publication No. 51-132196, methods of preparing water-soluble inorganic complexes by the reaction of a metal with ammonia, or sulfuric or phosphoric acid or their salts, with an alkaline metal, but the products do not have any film-forming properties.

The so-called "hardening phenomenon" also occurs in the production of film-forming properties, and occurs due to the supersaturation of a solute in the formation of a film formed through gel bonding of the materials into a crystalline structure. Thus, in the above-mentioned U.S. patents, to a water-soluble inorganic complex was added materials such as silica sol, sodium silicate, pozzolan or fly ash to supersaturate a metallic component such as Si, which, however, results in the production of a film providing little film forming properties, that is, in its failure to form a flexible coating film. Aqueous solutions such as of sodium silicofluoride and sodium silicoborate can be dried to produce powders but fail to form coatings. Likewise glass, for example, as a compound of silicic acid, boric acid and an alkali metal hydroxide, may be adapted to prepare water soluble coatings.

As described above, Teflon, which is a fluorine-containing compound, cannot be processed into a high molecular coating film by the use of inorganic compounds, per se.

It therefore is an object of the present invention to provide a water-soluble film-forming inorganic compound having high molecular weight, without the need of a solvent, and which is capable of being formed into a flexible coating film.

For providing such film-forming properties as possessed by conventional organic coatings, it may be necessary to convert the inorganic compound into a high molecular weight compound. Fireproof and flameproof characteristics are usually attributed to heat-resistant film-forming materials which are capable of blocking the supply of oxygen. Further, fireproof and flame-proof coating films suitable for metal plates and fibrous products are required to be flexible heat-resistant coating films. On the other hand, from the viewpoint of economy, it is best to avoid the use of a solvent, and polymerization associated with a high productivity is required.

The present invention has solved all of the above-mentioned problems.

SUMMARY OF THE INVENTION

Water-soluble film-forming compounds according to the invention can be produced only by the reaction of a metal, a hydroxide of an alkali metal, and hydrofluoric acid or boric acid and their salts or their submineral acid salts (referred to collectively as mineral acid compounds hereinafter) which are able to form a hydrate. For example, the reaction of Si, F and Na, probably produces sodium silicofluoride and has such a low solubility that it is incapable of forming an aqueous solution having a concentration of 2.45% or more in solid content even at 100° C. Another reaction of Si, B and Na, to probably produce sodium silicoboride is similar. In contrast, the aqueous solutions according to the invention having a solid content of 45% or more have been produced. These solutions have been analyzed as containing Si, F and Na, or Si, B and Na, and these materials are novel compounds.

According to the above-mentioned U.S. patents, for example, a reaction among silicon, sodium hydroxide and sulfuric acid can occur when sodium hydroxide flakes are dropped into a reaction vessel and contacted with metallic silicon, which is found at the bottom of the reaction vessel, and the reaction occurs at this localized area. When metallic silicon lumps were excessively laid over the bottom of the reaction vessel, and the reaction vessel was half-filled with a diluted solution of boric acid, and sodium hydroxide flakes were fed into the vessel, the reaction was intermittent, not localized, such that the reaction occurred, depending upon the solubility of the components in the reaction vessel.

Likewise, when a 1 m/m aluminum wire was immersed in the vessel, a reaction was accompanied by the appearance of a white cloud and could be observed not only in the vicinity of sodium hydroxide flakes scattered in the solution but also along the aluminum wire. Also, when metallic silicon was wrapped in an iron mesh and suspended 5 cm or longer above the bottom of the reaction vessel and sodium hydroxide flakes were supplied to the bottom but not placed in direct contact with silicon, the reaction commenced accompanied by the production of bubbles in the same manner as if the flakes were in direct contact with the silicon.

From the foregoing, the present invention has been demonstrated to be distinguishable from the localized reaction of sodium hydroxide flakes described in the above-mentioned U.S. patents, and this can be explained as follows: the dissolution of flakes settled at the bottom of a reaction vessel achieves an equilibrium point at a certain solubility, that is, the consumption of these flakes by the reaction or change in solubility due to convection, contributes to the additional dissolution of the flakes.

Water-soluble film-forming inorganic compounds, according to the present invention, can be produced by the reaction between a solid metal and a concentrated alkali metal hydroxide solution, in which hydrated boric acid and hydrofluoric acid takes part, the reaction proceeding as an exothermic reaction or under heating. With borax and sodium fluoride, owing to their lower solubilities than that of the acid, the reaction is not directly activated and can be controlled. In summary, the reaction must be frequently regulated so as not to cause boiling by cooling or by the addition of at least one selected from the group of hafnium compounds or zircon, zirconias and a zirconia by-product, zirca (these zirconium compounds are referred to collectively as zircons hereinafter) in amounts of 0.5 to 100% of the mineral acid compounds. In the winter, heating is carried out at 50° C. or higher temperatures to accelerate the reaction.

The "mineral acid compounds" mentioned above include hydrogen fluoride, hydrofluoric acid, sodium fluoride and ammonium fluoride. These materials are capable of hydrating accompanied by dissociation of hydrofluoric acid. Also, included in this term are boric acid, borax, sodium borohydride or borofluorohydric acid and their ammonium and metallic salts, which are capable of hydrating, accompanied by the dissociation of the boric acid.

With the above-mentioned diluted mineral acids as a reaction medium, the increased solubility of the alkali metal hydroxide can be shown, resulting in a strong alkaline (pH 11.5 to 12.6) product, while concentrated mineral acids can be used with the result of decreasing the solubility of the alkali metal hydroxide, accordingly producing a weak alkaline (pH 7 to 9) product.

If the above-mentioned reaction solution has a solid content of 10% or more when its specific gravity is 1.1 or more, and is an aqueous solution having a pH of up to 13, then a film-forming inorganic compound is formed, according to the invention, which is distinguishable from sodium silicofluoride or sodium silicoboride.

The reaction of a metal and a concentrated solution of alkali metal hydroxide flakes at the bottom of the reaction vessel can be carried out either under the addition of a gas of or a concentrated aqueous solution of a mineral acid, or in a mixture of a concentrated mineral acid and a metal, while supplying alkali metal hydroxide flakes, or less than a 10-time concentrated solution thereof, to the bottom of the reaction vessel. Thus, a reaction product having a specific gravity 1.2 or more and a pH of up to 9 can be obtained. In any case, the reaction temperature should be suitably regulated by heating the reaction solution if it does not reach 50° C. and to prevent boiling when the reaction solution reaches 90° C. to 100° C., zircons can be added or the reaction solution cooled.

Since the solubility of the alkali metal hydroxide in the concentrated mineral acid solution is small, it is necessary to heat or to allow the reaction to progress slowly. In the present invention, the supernatant of the reaction solution has a nearly definite composition because any of the components are soluble merely in respect to the solubility product, even if added in an excess amount.

The above-mentioned film-forming inorganic compound was coated on an iron plate and dried at ordinary temperature, and thus a film of $7\mu$ was obtained which was unaffected by a heating test to determine cracking, peeling, and the like.

Supersaturation of the metal reactant results in an increased strength of the above-mentioned film and acceleration of the hardening. For the realization of marked supersaturation, therefore, various materials are added to the above-mentioned film-forming inorganic compound. Suitable examples of these materials are, when zircon is used as the metal, a $SiO_2$-containing substance, such as silica sol, sodium silicate, pozzolan and silica fume, or calcined products. When aluminum is used as the metal, $Al_2O_3$-containing substances such as alumina sol, sodium aluminate, kaolin and bauxite are added to the film-forming inorganic compound. Thus, a film can be formed faster having a higher surface hardness, even at ordinary temperature. The addition of such a metal-containing material is suitable for working in the reaction solution in an amount of about 20% to 30% in solid content in the composition defined in claim 1 of the present invention, when expressed as $SiO_2$ or $Al_2O_3$. This modification in the process contributes, for example, to an improvement in pencil hardness of the film from 5H to 9H.

For the manufacture of a higher molecular weight (therefore greater in specific gravity) film-forming inorganic compound, the usual technique of heating and concentration can be performed as follows: To the aforesaid film-forming inorganic compound having a specific gravity of 1.2, alcohols having 1 to 18 C atoms (methyl to stearyl) can be added in much the same amount as the solid content. For example, a 20% alcoholic solution (alcohols: water=20:80) can be added to a film-forming inorganic compound solution having a specific gravity of 1.25, whereas only the high specific gravity product settles to the bottom of the reaction vessel and the top layer contains only low specific gravity compounds (low molecular weight) and alcohols, and thus the sediment can be removed from the bottom of the vessel to obtain the high specific gravity (about 1.4) product. In this case, since considerable time is required from the mixing to the settling of the high specific gravity product, a diluted mineral acid of pH 2 or more can be added to a 5 to 30% alcoholic solution and this diluted solution can thereto be added to a 20% to 40% film-forming inorganic compound solution having a specific gravity of 1.2, thereby accelerating the settling of the higher specific gravity product. With 99% methanol, even in a 1% alcoholic solution, faster gelation is carried out. It is unnecessary to add alcohol in an amount exceeding the solid content. The mixing of alcohol contributes to a decrease in the azeotropic point to allow hardening with surplus water being removed by heating.

Heating, which accelerates hardening and film-forming on the surface, may cause swelling of the compound due to excessive water. Also, heating after cold hardening has a similar tendency. For adsorption of excessive water, fine powder having up to 100 mesh of a metal such as Mg, Al or Fe capable of hydrating to form a hydroxyl group is added in an amount of from 1 to 500% of the solid content to the film-forming inorganic compound solution, whereby swelling due to the exothermic reaction which may occur on heating after cold hardening can be prevented. Calcined powder of a non-crystalline mineral which is heated about 500° C. and changed into a hydroxide, e.g., of silicic acid or alumina, is also effective.

Film-forming inorganic compounds according to the invention are noncombustible or refractory. For increasing adhesiveness, stickiness and refractoriness, there may be added at least one from the group consisting of kaolin, pyrophyllite, clay, terra alba, amorphous silica (pozzolan, silica fume), mica, vermiculite, and diatomaceous earth, and during the high temperature period, refract mullite or other alumina forming material may be added, to obtain an adhesive, refractory/-fire-preventive (1000° C. and higher temperatures) and high-strength coating. This compound may be used as a flexible, refractory adhesive for iron, stainless steel, aluminum, ceramic felt and board. The viscosity of the compound increases from 100 to 200 centipoise without any additive to 800 to 1500 centipoise with an additive, and the flexural strength is increased by mixing in mineral fiber. The addition of an amount of the additive equal to or exceeding the film-forming inorganic compound however may reduce the shock resistance. Adhesives obtained as mentioned above have a friction pull strength of as much as 30 kg/cm$^2$ with respect to steel.

The film-forming inorganic compound hardens under a hydration reaction capable of eluting active Ca ion. Hardening can be carried out more rapidly by addition of a hydration-exothermic agent containing quick lime or lightburnt dolomite, which causes removal of excess water and ion exchange.

Known cements capable of eluting calcium hydroxide can be used for hardening the compound. Also, cutoff cement is effective in hardening the film quickly by virtue of the exothermic reaction produced. A hardening reaction occurs between magnesia cement and the film-forming inorganic compound. Likewise, mixtures containing metallic aluminum, magnesium, iron or oxides of these compounds can hydrate accompanied by an exothermic reaction can function effectively. The cement can be added in an amount of from 1 to 3 times the amount of the excess water in the film-forming inorganic compound.

The film-forming inorganic compounds according to the invention are considered to be polymeric complexes, in each of which the boundary between the hydroxyl radical and excess water molecules is not clear, and thus have a disadvantage in that the film-formation on the surface is faster than hydration by heating or cold drying. There is an effective measure for overcoming this disadvantage, which comprises adding at least one selected from the group consisting of metal oxides, hydroxides, burnt products of amorphous metals, and the like, which are capable of converting into hydroxyl radicals which act to absorb water. The film-forming inorganic compound can be formed into hydrated beads of 5 to 80μ by spraying it on a dryer having an inlet temperature of between 150° and 600° C. Hydration of 2 to 7% could be shown with a KETTO moisture counter. The product was added in different amounts of from 1 to 100% to the film-forming inorganic compound, and the mixtures could be applied as coatings having good thickness.

Threads of fibers such as glass fiber, carbon fiber, cotton, synthetic fibers, and wool are composed of hundreds of yarns, and hold air. A coating which can replace such air and react with the film-forming inorganic compound, preferably a synthetic resin having an alcohol radical, for example, polyvinyl alcohol having alkali resistant properties, is suitable of use as a primer. Even if soluble in water, it is subjected to condensation with the film-forming inorganic compound to become insoluble.

In the following specification, raw materials for use in the present invention will be described. At least one metal may be used which is selected from the group consisting of metals of Groups I-VIII of the Periodic Table. For most uses, metallic silicon and aluminum are preferred. Reactivity becomes greater with increasing surface area. Metal in the form of a moderate or small size lump, grain, foil or wire can be used. These can be used repeatedly several times, if held in a mesh and suspended, as mentioned above, somewhat above the bottom, without being covered with the reaction product.

Any mineral or submineral acid which is capable of dissociating in water to produce boric acid or hydrofluoric acid, particularly borax or sodium fluoride, can be used. A gas of these acids can also be used.

In summary, from the viewpoint of safety, any of the above-mentioned zircons, whether in powder, lump, or other form, may be added to the reaction solution to prevent it from boiling due to an excessive exothermic reaction.

A zircon by-product, as well as zircon and silica fume, which contains a very small amount of hafnium, may be added. Any alkali metal hydroxide selected from the group consisting of Na, K and Li can be used whether in powder, flake or other form and in not more than a 10-fold (not more than a 5-fold for most uses) diluted concentration. Additives effective for providing supersaturation of the metal are silica, alumina sol, and alkali metal salts such as sodium silicate, sodium aluminate, the above-mentioned amorphous minerals, calcined products of them, the above-mentioned oxides capable of converting into hydroxides, and hydroxides alone or in a composite. Alcohols may be added for obtaining a high specific gravity product. Since methyl alcohol causes gelation to occur too quickly, and ethyl alcohol is expensive, denaturated alcohol is preferred. Isopropyl alcohol (I.P.A.) can also be used to obtain a high yield economically. The selection of an appropriate alcohol depends upon which mineral acid is used.

The present invention is considered to include the use of other mineral acids as well, if they have a settling effect. To a 20% alcohol solution, a mineral acid solution such as pH 2 hydrochloric acid is added in 20% solution, and can be used to obtain a higher sedimentation rate. Any mineral acid may be used which is other than the mineral acid being used as a reactant for producing the film-forming inorganic compound because both are compatible.

Suitable fillers for use in getting a refractory property and appropriate film thickness are kaolin, amorphous silica-containing mineral powder, silica fume, magnesium hydroxide, aluminum hydroxide, or compounds capable of hydrating to elute these compounds. The fillers are preferably added as a very small powder up to 100 mesh in size.

The feature of the present invention resides in that a reactant is a solid or a liquid having a higher specific gravity than that of water and thus settles to the bottom of a reaction vessel. Each reactant therefore can not be present in the solution over a certain limit according to the theory of solubility. If excessively added, the surplus reactant remains undissolved, and a supernatant is formed owing to the convection caused by the exothermic reaction. The ratio between the metal and mineral acid cannot be such ratio as the dilution reaction equivalent, because they react to form the product in accordance with the dissolved amount of alkali metal hydroxide, even if they are excessively used.

The water-soluble film-forming inorganic compounds according to the invention are divided into two groups, one group consisting of Si, F and Na and the other group consisting of Si, B and Na, and have a solid content of 20% or more, as shown by the results of an analysis by the Kanagawa Prefecture Industrial Laboratories (Japan), and thus it was demonstrated to be neither sodium silicofluoride nor sodium silicoborate. Either of these groups of compounds can be coated on a steel plate as a film having a thickness ranging from 5 to 100μ and neither cracking nor peeling occurs to these films.

The film-forming inorganic compound according to the invention has a structure probably expressed by the formula $[A_aB_b]_rC_cD_d$ or $[A_aB_bC_cD_d]_sC_pD_q$ wherein A is Si or Al; B is FH, $BH_3$ or $B_2O_3$; C is Na, K or Li; and D is $H_2O$ or OH; and a, b, c, d, p, q, r and s are each representative of the number of moles of their given component.

An Si—F—Na compound produced according to claim 1 of the present invention was applied to a steel foil of 30μ and dried at 100° C. to get a film of 6μ. At 2 mm and 90° flex, neither cracking nor peeling occurred. The heated and dried product had a pencil hardness of 3H to 5H. No rust on the steel foil was observed after standing at 50° C. (90% RH) for 7 days, thus demonstrating the rust inhibiting property of the compound.

The products defined in claim 4 according to the invention were applied to a polyester non-woven fabric. Of them, one (Si—B—Na) became soft compared with the other (Si—F—Na). Both were flexible, and neither cracking nor peeling was noted. They were refractory when directly ignited with a lighter.

A 50μ iron foil was coated with another product and dried at 80° C. The film thickness was 7μ and harness was 9H or more. Uncoated foil could be cut by flexing the foil 50 times, while foil coated with the product according to the invention could not be cut by 120 flexes. Uncoated iron plate of 3.2 mm was heated with a burner and then perforated. The uncoated plate took only 100 sec. to perforate, while it took 250 sec. to perforate ones coated on both sides with a S—F—Na product according to the invention.

To a Si—F—K product defined in claim 4 and having a specific gravity of 1.25 and a solid content of 27% as determined with a KETTO moisture counter, a solution containing 20% I.P.A. was added in an amount of 30% by volume and allowed to stand. One hour later, sediment was removed with a yield of 55% by weight (Specific gravity: 1.45), which product is referred to as P—Si—F—K. Similarly, to a Si—B—Na product having a specific gravity of 1.23 and a solid content of 25% as determined by a KETTO moisture counter, a solution containing 20% denaturated alcohol was added in an amount of 40% by volume, and one hour later, a sediment was obtained with a yield of 50% by weight (Specific gravity: 1.43), which product is referred to as P—Si—B—Na. The P—Si—F—K product was applied to a 20 mm steel bar to a 10μ thickness, and then cut with an oxygen burner. The film did not burn like a usual coating, and also no rise was observed adjacent the cut edges. The rod steel was then coated with the P—Si—F—K product when the cutting site had reached a temperature of about 200° C., and was allowed to stand in the open air for 6 months, with no rust occurring.

The products according to the invention defined in claims 1, 2 and 4 were subjected to differential thermogram analysis (DTG) and the results showed a marked removal of excess water at 140° to 180° C., besides small peaks of crystal water-removal at about 600° C. and 800° C. and little change in weight. On the other hand, the products were applied to an iron plate and heated to 200° C. where excess water was removed, with the result of faster film-formation, later removal of excess water and frequent occurrence of swelling. Metallic compounds and burnt mineral powder capable of hydrating and thus converting into a hydroxide or crystal water to absorb excess water, for example, compounds of magnesium and aluminum and burnt diatomaceous earth in the form of powder are effective. These additives were demonstrated to have a remarkable effect when added to the P—Si—F—K or P—Si—B—Na product in about 5 to 10 parts by weight. The 10μ coated iron plate was dried at 180° C. and heated to 1000° C. with a burner with no swelling resulting.

The products according to the invention defined in claims 1 through 5 are aqueous solutions, and thus can be coated to about 10μ in thickness. For increasing the coating thickness to improve the refractory and fireproof properties, fillers should be added. Suitable fillers such as kaolin, amorphous silica, pozzolan, Zeeklite, silica fume, and pyrophyllite sinter, which have storage-stability may be used, and refractory properties can be provided by removal of pyrophyllite crystal water, and the change in mullite phase and cristobalite phase. Adhesive properties can be imparted with diatomaceous earth and flexural strength with mineral fibers. With these mixtures as adhesives, for example, laminated sheets consisting of SUS foils and alumina silica papers were manufactured. They were flexible and had been demonstrated by a 1000° C. heating test to have refractory properties and without occurrence of peeling.

On the other hand, thick transparent coatings can be formed with transparent fillers such as crystal, magnesium hydroxide and aluminum. The products according to the invention defined in claims 1 to 5 were subjected to spray drying at 200° C. and higher temperatures, and consequently most of the excess water was removed, and only several percent water remained. Thus, fine ceramic beads still having reactivity were obtained. The beads were observed with a microscope to be transparent and spherical (5 to 80μ).

The claimed products are inorganic and therefore cannot be burnt by high temperature heating, allowing for a temperature of 600° C. at the spray inlet and therefore a higher spray supply associated with a higher yield. Thus, low cost fine ceramics can be obtained.

The products according to the invention defined in claims 1 through 5 can include a hardening agent, e.g. magnesia cement, in an amount of from 3 to 20%. Mixing magnesia cement with any of the products defined in the claims of the present invention results in hardening. Cements characterized by exothermic hydration, whether at ordinary temperature or by heating, and calcium compounds having similar properties, such as quick lime and dolomite, are mixed as fillers, and also work as hardening agents. These can be adhered to metal with decreased hardening and shrinkage and produce a film having refractory properties by heating at 1000° C.

As mentioned above, the products can be effectively film-formed by heating under reduced pressure to remove excess water (for example, at 60° C. and 740 mHg corresponding to 180° to 200° C. at atmospheric pressure) but there is difficulty in devising a continuous process. Fiber and felt are composed of a large number of yarns and so hold air, and therefore the products according to the invention can be heated under an tightly enclosed condition, with the result of obtaining films which crack due to thermal expansion, and thus having neither refractory properties nor pliability. By using PVA, acryl resins and polysaccharide proteins, which have an alcohol acid radical and alkali resistance, as a primer and for the air replacement, and the products according to the invention as a finish coating, then causing a condensation reaction and as a result chemical bonding occurs, and after drying at low temperatures, a film can be obtained having refractory and fireproof properties while flexibility is maintained.

The following will describe the water-soluble film-forming inorganic compounds according to the invention for use in fireproof and refractory composite materials containing no organic compounds, unlike the above-mentioned products, and hence are noncombustible and will not generate decomposition gas at temperatures as high as 1000° C.

Figure 1:
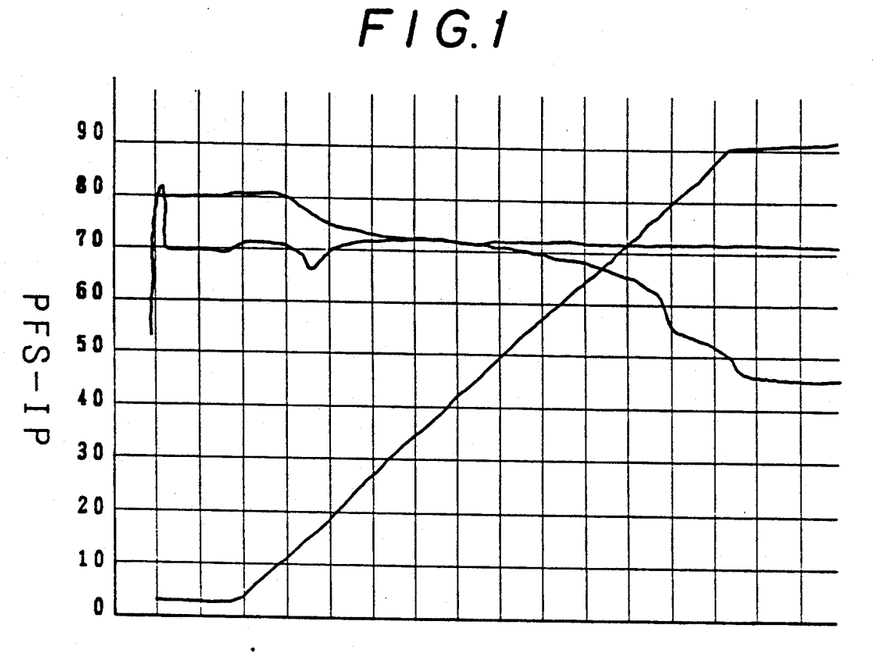
FIG. 1 shows differential thermograms of the P-Si-F-Na product (No. 7 in Table 1)
Figure 2:
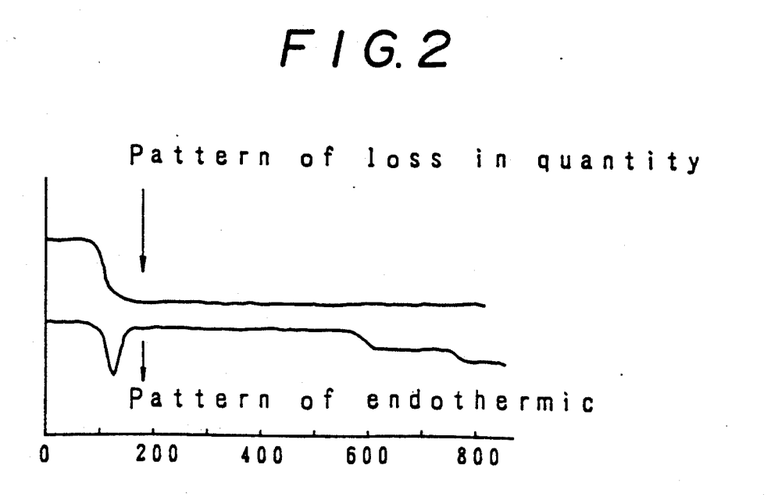
FIG. 2 shows the patterns of weight loss and heat absorption depicted in FIG. 1.

FIG. 1 shows the results of a differential thermogram (DTG) analysis of certain products, and FIG. 2 shows differential thermograms revealing that the change in weight of the products at high temperatures after removal of excess water was very small. This helps explain why neither cracking nor peeling was produced. Friction pull test with steel plates as substrates showed a strength of 20 or more Kg/cm² on heating to 300° C., and coating a steel plate with them prevented rust from forming after 7 days under conditions of 90 RH and 60° C.

With these products, the following test results were obtained:

Over both surfaces of a steel plate of 3.2 mm in thickness, product No. 7 in Table 1 was applied at a rate of 150 g/m², and dried. With a welding burner, it took 200 sec. to perforate this plate while an uncoated steel plate could be perforated in 38 sec. Over both surfaces of a 24 mm gypsum board (produced by Hoshino Co., Ltd.) were coated products Nos. 1 and 2 in Table 1, respectively, and heated to 880° C. by a propane burner for one hour. The surface temperature of the back was as low as 60° to 80° C. In contrast, the control board reached 800° C. by the same heating. Thus, the fireproof and refractory materials according to the present invention can secure necessary performance at decreased thickness.

Mineral powders (kaolin and pozzolan) each were added to product No. 7 in Table 1 in an amount of 60%, and the mixtures were applied over a stainless steel foil of 30μ at a rate of 200 g per m². Then an alumina silica paper of 2.5 mm thickness and a blanket of 12.5 mm thickness (manufactured by ISOLITE Co. Ltd.) were laid over the coated foil to obtain flexible sheets. These sheets were heated at 1000° C. for one hour in an electric furnace without causing peeling.

A 100μ metallic aluminum and a 10 mm thick primary-calcined carbon felt were put on each other in the same way as mentioned above, and 1000° C. flame of a microburner was applied to the aluminum surface. After 3 minutes of application, the flame failed to perforate the aluminum though the primary-burnt carbon was burnt with deterioration. In contrast with this, aluminum alone was easily fused.

TABLE 1

| Code | Element | Solid Content (600° C.) | pH | Specific gravity | CP | Others |
|---|---|---|---|---|---|---|
| 1. FSL | Si, F, Na | 22–25 | 12–12.4 | 1.20–1.25 | 100–300 | |
| 2. HWL | Si, B, Na | 22–25 | 12–12.4 | 1.20–1.25 | 100–300 | |
| 7. PFS-IP | Si, F, Na | 42–45 | 12–12.4 | 1.4–1.45 | 1000–1500 | I.P.A. |
| 8. PHW-IP | Si, B, Na | 42–45 | 12–12.4 | 1.4–1.45 | 1000–1500 | I.P.A. |
| -AE | Si, B, Na | 42–45 | 12–12.4 | 1.4–1.45 | 1000–1500 | *D.a. |

*Denaturated alcohol

It can be said from this that the water-soluble film-forming inorganic compounds according to the invention can be used as surface coatings or adhesives and can be exposed to a very high temperature burner flame without breakage of the inorganic coating. The compounds inhibit thermal conduction as the result of removing crystal water, and, with respect to a refractory coating film, prevent radiating heat from flowing-in. The inorganic compounds are novel not only from the standpoint of having improved refractory and adhesive properties without peeling at high temperatures, but also from the standpoint of being capable of producing flexible composite materials in a normal state.

In view of these properties and characteristics, the water-soluble film-forming inorganic compounds can be used, with or without the addition of the above-mentioned fillers, for manufacturing a variety of refractory and fireproof composite materials.

Of the water-soluble film-forming inorganic compounds according to the invention, four typical compounds are summarized in Table 1 as mentioned above. These may be mixed with any natural or synthetic mineral powder, fiber or layer lattice compound, and the resulting mixtures obtain additional and similar properties. Suitable examples are kaolin, pozzolan, silica fume, bauxite, pyrophyllite, metal oxides, metal hydroxides, cements, etc. Any mixture having as a main function the characteristic according to the invention cannot be said to be outside of the scope of the present invention if it is associated with such a mixing with a high temperature formed material, or the like.

The term "plate(s)" is used herein to refer to a noncombustible or fire resistant material. A metal foil, if flexible, may be processed into a flexible sheet, and if not flexible, into a composite plate. Suitable metal foils for use are composed of iron SUS, Al, Cu, etc. and vary in thickness up to 100μ.

The term "inorganic fiber(s)" covers fibers of alumina, alumina-silica, carbon boron, silicon nitride, etc., which are formable into paper, wool and blanket form. Suitable organic surface materials for use should produce no poisonous gas, little fumes, and contain slight calories. Natural wood, paper and non-woven fabric having thicknesses of up to 500μ, preferably 50 to 200μ, are suitable.

A combustible material can be impregnated or coated with a fire-preventing agent to raise the kindling point. Those materials which are easily folded, e.g. sliced wood paper, are coated on the back to be reinforced before use. An example of a suitable coating for this is a mixture obtained by adding a fire-preventing agent to a substance having an alcoholic acid chemically bonded to the inorganic compound according to the invention, such as PVA. The term "non-combustible film(s)" is applied herein to noncombustible papers containing inorganic fiber as alumina, silica, alumina silica, carbon, glass, boron, and silicon nitride, and fabrics and non-woven fabrics of inorganic fiber.

The refractory, flexible sheet composite covering materials and refractory-covering process according to the invention will now be described.

For solving problems with the prefabrication of a refractory covering, materials having a cushion associated with a high restoring property should be selected rather than rigid materials which easily undergo damage by impact. Lightweight and heat-insulating materials are of low strength and thus must be reinforced. From this viewpoint, that is, for improving impact resistance and antifrictional properties, a metal, particularly a light-weight, flexible, anticorrosive stainless steel foil, may be used. Adhesives for processing this into a composite should have 3 hours fire-resistance, and hence organic adhesives are not usable. Water glass can be processed into a refractory adhesive capable of being formed into film which does not undergo cracking at up to 80° C. However, they are difficult to obtain having flexible properties in their normal state and being stable at 1000° C. or above without cracking. Another method comprises mixing a filler capable of losing much crystal water during heating, such as aluminum or magnesium hydroxide, to water glass, but it also is not flexible.

The present invention can solve these problems in such a way that the water-soluble film-forming inorganic compounds are processed into adhesives having good adhesiveness, in particular to stainless steel high in anticorrosive properties, and in addition, by mixing an amorphous filler for improving thickness and durability and imparting flexibility.

Adhesives comprising a water-soluble film-forming inorganic compound according to the invention are heated with removal of excess water at 170° C. to 180° C., and crystal water at about 470° C., 580° C. and 650° C., respectively, but with little change in weight in the temperature range between 250° C. and about 800° C., showing that it is difficult for cracking to occur.

For example, to a filler of the before-mentioned Table 1 were added kaolin 15 parts, amorphous pozzolan 35 parts, and diatomaceous earth 5 parts, to change the viscosity from 400 to 1400 cps.

Admixtures according to the present invention are not limited to those mentioned above. One of the aforesaid adhesives was coated over a 30μ stainless steel foil and a 12.5 mm alumina silica blanket (8p: ISOLITE Co. Ltd.), respectively. Another similar foil and another similar blanket were put on each other with the adhesive. These samples (10 cm × 10 cm) were incubated at 1200° C. for 3 hours in an electric furnace. No peeling or cracking occurred on any sample.

Figure 3:
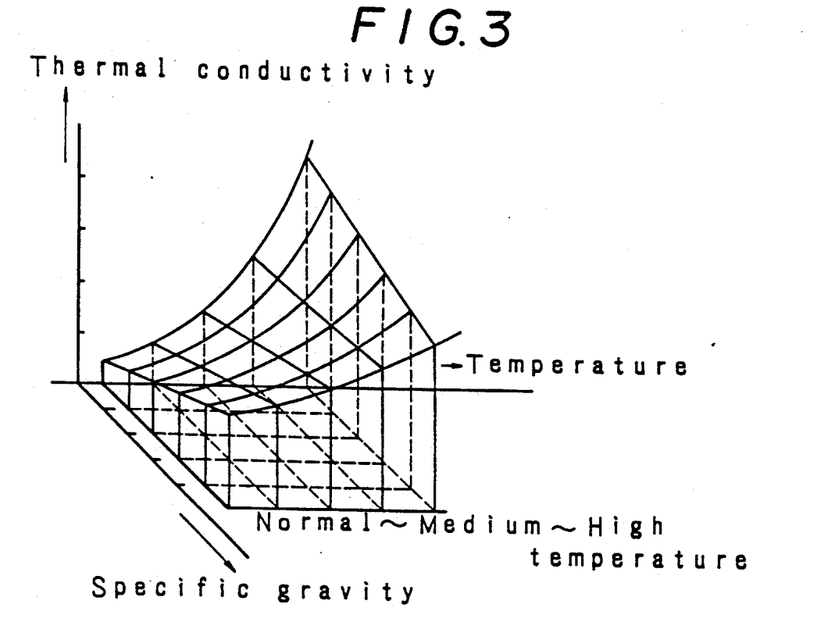
FIG. 3 shows the relationship between thermal conductivity, bulk density and temperature.

In the same way as in the adhesive according to the invention, the filler was added to water glass No. 3, and tested likewise, with the result of cracking and peeling in places. Of the heat-insulating inorganic fiber materials, alumina and alumina silica are refractory to temperatures of 1000° C. or above. FIG. 3, however, shows the temperature-thermal conductivity characteristics of a light-weight heat-insulating material, which thermal conductivity rises and heat insulating property falls with higher temperatures. FIG. 2 also shows the relationship between water content and thermal conductivity, such that water found in the material contributes to increasing the thermal conductivity and decreasing the heat insulating property.

The refractory adhesives according to the present invention, as demonstrated by the above-mentioned differential thermal analysis, have 3 peaks where crystal water is removed. On the other hand, the refractory composite coatings according to the invention gave good results attributed to the heat insulating properties of the blanket alone in moderate and high temperature ranges, as summarized in Table 2 below.

TABLE 2

| Product | Temperature °C. | | |
|---|---|---|---|
| | 400° C. | 600° C. | 800° C. |
| 8P × 25 m/m Blanket | 0.063 | 0.093 | 0.14 |
| SUS50μ Adhesive (Present invention) 8P × 25 m/m | 0.057 | 0.072 | 0.09 |

The results were yielded in accordance with the "Method for determining heat insulating constants".

The features of the present invention will be described in further detail hereinafter.

The refractory composite covering material (8P×25 mm) according to the invention has good performance corresponding to a 45 to 50 mm blanket which is a component of the covering material. Heat insulating properties depend in combination on thermal conduction through a solid, thermal convection and heat radiation. The refractory covering materials according to the present invention have good heat insulating properties, which materials use a metal foil as a surface material, and film-forming properties of the adhesive according to the present invention used therefor. If damaged by a superheated flame, the metal foil on the surface becomes nearly equal to the property of blanket alone. When the metal foil keeps its refractory properties, thermal convection is controlled by the radiant-heat reflecting effect caused by the metal foil. This phenomenon can be demonstrated by the Examples described below.

The refractory covering materials according to the invention are flexible sheets, and hence they can be applied to a joint.

According to the present invention, an alumina silica paper of 0.5 mm to 5 mm, refractory to 1000° C. or above and 50μ stainless steel were put together through the intermediation of an adhesive according to the invention, to form a flexible film (tape) sheet. A refractory tape wide enough to cover the joint was put on the joint with the adhesive according to the present invention to integrate the refractory covering materials. Thus the aforesaid problems have been solved.

The refractory covering materials according to the invention were of 30 mm in thickness and within 6 kg/m$^2$ (<D=0.2), even when formed into a composite.

The refractory adhesives according to the invention have a bond or adhesive strength of 28 g/cm$^2$. When it is temporarily attached with a tape, excess water is absorbed into the blanket. One hour later, the adhesive strength increases to 3.2 kg/cm$^2$. By making several dumpling-shaped or spot bonds, an increased adhesive strength (30 k/cm$^2$ at 4 weeks) can be obtained. Four spot bonds (20 cm$^2$) ensures safe adhesive strength. Further, for meeting long term safety, firm fastening was made in combination with stud electrodeposition as paste and nails.

There are various known methods of stud electrodeposition. The product according to the invention is thin and so a T-pin technique involving a temporary fastening with a tape, and then perforation from the surface to steel frame, followed by electrodeposition, is advantageous. There is another technique involving positioning a stud vertically and then skewering. Shape and length of the stud and the method of adhesion are not limited. For safety, a combination of adhesion and stud technique is preferred though each method can be used alone.

Materials for use in the present invention will now be described.

Any metal foil can be used, and stainless steel foils are preferred because they are virtually immune to corrosion. From the viewpoint of refractory properties, rolled products are recommended. Stearites are preferred rather than ferrite. Considering the aspects of flexibility and long term refractoriness, a thickness of 20 to 100μ is suitable.

Suitable heat-insulating inorganic fiber materials may be, from a practical viewpoint, wool, felt and blanket. Joint covering materials are preferably paper, alumina, alumina silica, boron, silicon nitride having a refractory range of 1000° to 1200° C. From the standpoint of economy, materials may be selected between 10 to 40 mm taking long-term refractoriness into consideration, and needle-punched alumina silica blanket or felt is suitable.

Suitable adhesives may be either of the four water-soluble film-forming inorganic compounds specified in Table 1 or intermediate substances. Suitable fillers are necessary to have the effect of creating the above-mentioned initial bond strength, hardening without involving cracking nor peeling, and they preferably are added in an amount of from 10 to 100% of the water-soluble film-forming inorganic compound.

As described above, a metal foil and heat-insulating inorganic fibrous material are bonded together with a refractory adhesive to make a refractory, flexible sheet covering material. When used in accordance with the above-mentioned refractory covering process, the following advantages are attained:

(1) Refractory covering materials each made of a heat-insulating inorganic fibrous material and a 50μ thick stainless steel of standard No. 304 as a metal foil bonded together with such a refractory inorganic adhesive have advantageous multifunctions as refractory covering materials for steel frames over the prior art.

(2) The refractory covering materials can be cut easily with a simple cutting tool such as a knife or a pair of scissors without needing a special cutting tool.

(3) The refractory covering materials are capable of being cut or used without generating dust, and thus there is no danger to the user's health.

(4) The refractory covering materials have pliability and flexibility and can be sent as desired.

They, therefore, can be niter-jointed on any part (flat, end, corner, curved, pipe-arranged, etc.) integrally without leaving an open space.

Further they can be miter-jointed to cover a corner part by bending using the surface metal foil.

(5) The refractory covering materials are effective also as a finishing material by utilizing the surface of the stainless steel component, thus omitting the need for dressing work.

The stainless steel surface can be clean without generating dust, or the like.

(6) The refractory covering materials are capable of being formed into a film of about half the thickness over those of the prior art. By virtue of this, less load may be applied to the structure.

(7) The refractory covering materials can be cut and used easily, and in a smaller thickness of the covering, involving lighter weight. They thus result in an improvement in applying refractory covering materials compared with the prior art.

Moreover, the amount of materials required can be reduced by cutting the materials in the factory, which lessens waste.

(8) The refractory covering materials can be manufactured in a factory and hence quality of the materials can be controlled and they can be formed in a predetermined thickness, contributing to making their properties stable.

The refractory covering materials are put on steel frames with the effect of making the quality and performance of the refractory covering itself stable.

(9) The refractory covering materials can be applied to a steel frame not only directly before the construction of the steel frame but also in the factory for manufacturing the steel frames after their construction.

They can be applied to the pillar members of a steel frame as well as to the beam members.

They can be applied to the pillar and beam members of steel frames of not only H-steel but also steel pipe, box-type, and other kinds.

(10) When exposed to a fire, the metal foil surface has the effect of blocking the refractory covering material from the heat stream from the high temperature ambient atmosphere, thus the materials have good performance at high temperatures compared with prior art covering materials. By virtue of this, a smaller thickness is necessary for the refractory covering materials of the present invention than for prior art materials.

Because of this, the efficiency of the work to apply these materials can be much improved.

(11) The surface metal foil (a 50μ thick stainless steel) of the refractory covering materials has enough strength to support the heat-insulating material, and hence the materials can be miter-jointed on steel frames using fewer spot fastenings.

(12) The covering materials can be firmly put on only through several stud (Pin) weldings. In the part jointed to slab concrete or the like, the metal foil itself can be welded by spot welding through the intermediation of a small steel plate used as a holder.

By virtue of this, the work efficiency for fastening such materials has been markedly improved compared with the prior art processes.

Owing to the simple use of these materials, specially skilled users are unnecessary.

(13) The present invention is the first to enable one to put refractory covering materials on a steel frame as a prefabrication product, and to establish the process therefor.

BRIEF DESCRIPTION OF THE DRAWINGS

FIGS. 6 through 9 are illustrative of a material prepared by the process according to the present invention.

DESCRIPTION OF THE PREFERRED EMBODIMENTS OF THE INVENTION

The present invention will be described more fully hereinafter by way of 37 examples. Examples 1 through 20 are directed to the preparation of water-soluble film-forming inorganic compounds. Examples 21 through 29 are directed to the preparation of fireproof and refractory composite materials, and Examples 30 through 37 are directed to the preparation of refractory flexible sheet composite covering materials. The refractory-covering process is also described in these examples.

EXAMPLE 1

Metal silicon (300 g) was densely laid to a thickness of 5 to 10 mm at the bottom of a plastic 1-liter vessel, and a 5-fold dilution (300 cc) of borax decahydrate was poured into the vessel. Then several sodium hydroxide flakes were dropped on the silicon and diffused in the solution without any reaction occurring on the surface of the silicon. In addition a 3-fold sodium hydroxide dilution (50 cc) was added to the vessel, which solution sank to the bottom of the vessel due to its heavier specific gravity, and a reaction occurred such that foaming was noticeable on the surface of the metal. The solution near the bottom was sampled with a dropping pipette and had an increased concentration and a pH of 14, while the pH of the surface solution was as low as 9.5.

The ambient temperature was 21° C. and the temperature of the liquid was 18.4° C.

EXAMPLE 2

In a similar vessel to that used in the preceding Example, metallic aluminum wire (purity 99.9%) was cut in pieces 10 cm long and 0.5 mm in diameter (200 g) and were laid on the bottom of the vessel. A 10-fold boric acid dilution (300 cc) was added together with a spoonful of sodium hydroxide flakes. A reaction occurred in the vicinity of the metal aluminum and spread not only along the wire but also around the wire such that the wire appeared to be surrounded by a white cloud. This means that the commencement of the reaction was due to the production of an alkali concentration in accordance with the solubility at the bottom of the reaction vessel, and was not a localized reaction of only the solid alkali as pointed out in the aforesaid U.S. patents.

EXAMPLE 3

In the same way as in the previous Examples, metallic silicon was closely laid at the bottom of a reaction vessel, and 300 cc of a sodium fluoride aqueous solution (sodium fluoride 100 g+water 200 g) was added, followed by 50 cc of a potassium hydroxide solution have a pH of 13. Alternatively, in the opposite order to this procedure, firstly the potassium hydroxide solution and then the metallic silicon and the sodium fluoride solution (300 g) were placed in turn in the vessel. Since the reactants were the same salts, a similar reaction did not begin immediately but occurred gradually. The ambient temperature was 18° C. and the temperature of the liquid was 16° C.

EXAMPLE 4

Under similar conditions (an ambient temperature of 21° C. and a temperature of the liquid of 18° C.), sodium hydroxide flakes (15 kg), followed by water (50 liters) were poured into a 250 liter stainless steel drum. It could be observed that a part of the flakes immediately diffused at the bottom to form a concentrated solution. Dissolution of the flakes was incomplete, and a part of the flakes remained as a white solid at the bottom. Subsequently, 25 kg of metallic silicon lumps of 5 to 10 mm in diameter were placed in the vessel, and then at the bottom, a reaction with the concentrated hydroxide solution occurred with continuous foaming from the surface of the silicon lumps. Subsequently, 45 kg of a mixture of water (20 liters) and borax decahydrate (25 kg) was added and water was added to make 1 liter. The temperature of the drum wall rose to 90° C. and boiling occurred, thus an additional 50 liters of water was added and the solution was allowed to stand. On the following day, the supernatant (pH 12.6, specific gravity 1.23 and solid content 24%) was transferred to another drum, and a volume of 100 liters was obtained.

At the bottom, metallic silicon and unreacted sodium hydroxide remained undissolved. Thus, borax (15 kg) was added, followed by water to equal 150 liters. Then fresh steam was blown into the drum. When the temperature rose to 50° C., the reaction began again. On the following day, a whit reaction solution (pH 12.6, specific gravity 1.21 and solid content 21%) was obtained. In this way, when the reactants were added in excess, a similar reaction product was obtained by addition of the supernatant having a specific gravity of 1.1 or more and a pH reaching 12.6 or below.

EXAMPLE 5

Under similar conditions (ambient temperature 25° C. and the temperature of the liquid 21° C.), 22 kg of metallic silicon lumps (30 mm in diameter), 10 kg of boric acid, and 3 kg of potassium hydroxide were mixed in solid state, and the mixture was placed in an SUS drum similar to that used in the preceding Example. Then 70 liters of water was added. Immediately, an exothermic reaction at 50° C. commenced and on the following day, crystal solid was separated. To the resultant supernatant, 1 kg of potassium hydroxide was added, resulting in a transparent viscous solution, and was filtered through a cotton cloth. Thus, a transparent solution (pH 12.2 and specific gravity 1.44) was obtained amounting to 12.5 liters (about 18 kg). The filtration residue was allowed to stand, and a transparent supernatant (pH 12.2 and specific gravity 1.45) was obtained. The last residue of which the majority was fine particles of metallic silicon amounted to 5.5 kg.

EXAMPLE 6

In Example 4 described above, increasing amounts of borax (10, 15, 20, 30, 40 and 50 kg, respectively) were added, and each reaction was terminated and subjected to analysis. In each case, a transparent solution (pH 12 to 12.6, specific gravity 1.2, and solid content 20%) was obtained. The reaction results in each case were in accordance with the theory of solubility at the bottom of the reaction vessel, and the respective reaction products were approximately the same.

In Examples 4 through 6, analysis of the products was conducted with a spectrophotometer, and any element other than Si, B, Na and K was detected.

EXAMPLE 7

Instead of using borax as in Examples 4 through 6, sodium fluoride was used. Upon reaching a pH of 12 to 12.6 and a specific gravity 1.2 or more, the supernatant was transferred to another drum. In each case, a transparent solution (pH 12 to 12.6, specific gravity 1.2 to 2 and solid content 20 to 35%) was obtained.

One example of these will be described as follows: In a SUS drum as used in the previous Examples, 40 kg of silicon lumps of 20 to 100 mm in diameter were closely laid, and then 15 kg of sodium hydroxide flakes were sprinkled over, and 50 liters of water (15° C.) was added. Immediate formation of a concentrated alkali solution, which underwent a surface reaction with metallic silicon accompanied by continuous foaming was produced, which diffused at the bottom to form a concentrated solution. Dissolution of the flakes was incomplete, and a part of the flakes remained as a white solid at the bottom of the drum. Subsequently, a mixture of 40 kg of sodium fluoride and 50 liters of water was added to the reaction vessel. An activated reaction occurred and began about to boil, and thus 60 liters of water was added to cool it. After that, the temperature of the solution fell below 40° C., and then fresh steam was blown into it. When the temperature rose to 50° C., the reaction again became active. The transparent supernatant, upon reaching a pH of 12.6 and a specific gravity of 1.24, was transferred to another drum and allowed to stand stationary. The solution had a pH of 12.4 and a specific gravity of 1.25 at ordinary temperature. From the resultant solution, 100 cc was sampled and 20 cc of 20% hydrofluoric acid was added gradually to it. Both were dissolved in each other with failure to become a gel. For comparison, the hydrofluoric acid solution was added to a 35% sodium silicate solution, with the result of gelation. The products according to the present invention were transparent and in each case the element in them was Si, F or Na.

EXAMPLE 8

As an alternative to Example 2 described previously, to metallic aluminum (300 g) were added zircon (10 g), followed by a 5-fold diluted lithium hydroxide solution (100 cc). Then an exothermic reaction occurred between the solid metal and the concentrated alkali solution, and 35% boric acid (80° C.) was blown gradually to the bottom of the vessel through a 3 mm SUS pipe until the pH reached 9.5, thus resulting in a viscous liquid. Thus the supernatant was transferred to another vessel, which was sealed airtight, and then allowed to stand. One day later, a transparent, viscous solution of pH 7.8 and specific gravity 1.6 was obtained.

EXAMPLE 9

In an airtight SUS 5-liter vessel, a mixture of 1 kg of metallic silicon of about 10 mm in diameter and potassium hydroxide flakes (150 g) was placed. The gas in there was conveyed through a pipe into a water tank so as not to be discharged to the air. Water (2 liters) was fed through an inlet, and upon reaching 80° C. by the resulting exothermic reaction, anhydrous hydrofluoric acid gas was fed gradually toward the bottom of the vessel until reaching a pH of 9.5 (up to 10). While feeding the gas, the solution was sometimes heated so that the temperature of the reaction solution did not fall to below 50° C. Then the reaction was terminated and the supernatant was removed and allowed to stand. The last product was transparent and viscous, and had a specific gravity of 1.3 and a pH of 7.6. Using borofluoric acid instead of anhydrous hydrofluoric acid and using sodium or lithium hydroxide instead of potassium hydroxide, similar viscous transparent products were obtained. In a different order in the procedure, for example, a mixture of silicon and 38% hydrofluoric acid was heated, and solid alkali metal was sprinkled over it to obtain a pH of 10, and the same product having a pH of 8 and a specific gravity of 1.35 was obtained. No element was detected with a spectrophotometer (Shimazu, Tokyo) other than Si, F, Na, K and Li. Addition of a fluoride to sodium silicate caused hardening. For these reasons, the product according to the present invention proved to be a hydride but in state of solution, and not any known substance.

EXAMPLE 10

To the products according to the invention obtained in Examples 4 through 6 were added sodium silicate (No. 3; Nihon Chemicals, Japan) as the metallic reactant at increasing rates of 0, 3, 10, 30 and 40%, respectively, and each was applied to a SUS foil, and was heated to and cured at 100° C. Then a 5 mm bending (90° C.) test was performed. At thicknesses of 20μ or below, no occurrence of cracking was observed. The hardnesses were between 5H to 9H. Likewise, Cataloid-SA (SiO$_2$, 30%; Shokubai Kasei Co., Ltd.) was added in an amount of from 1 to 35% and applied to a SUS foil to a coating thickness of 10μ or less. After heating and drying, a 2 mm bending test was performed, and no peeling was noted.

EXAMPLE 11

TABLE 3

| Product No. | Product (100 g) | Solid Content (%) | Excess (%) | Cement (g) | Curing Cold | Curing Hot | Cracking | Hardness | flaking off |
|---|---|---|---|---|---|---|---|---|---|
| 1. | Si—F—Na | 24 | 76 | #1 × 100 | | ○ | NO | >9H | NO |
| 2. | Si—B—Na | 25 | 75 | #2 × 200 | ○ | | NO | >9H | NO |
| 3. | Si—F—Na | 24 | 76 | #3 × 150 | | ○ | NO | >9H | NO |
| 4. | P—Si—B—K | 44 | 56 | #4 × 150 | ○ | | NO | >7H | NO |
| 5. | P—AL—B—Li | 46 | 54 | #5 × 100 | ○ | | NO | >9H | NO |
| 6. | P—AL—F—Na | 43 | 57 | #2 × 80 | | ○ | NO | >9H | NO |
| 7. | P—Si—F—Na | 45 | 55 | #3 × 60 | | ○ | NO | >9H | NO |
| 8. | P—Si—B—Na | 44 | 56 | #6 × 70 | ○ | | NO | >7H | NO |

*1. Heat was applied until the surface reached 60° C. or higher.
2. Measurement was made 30 days after.
3. Magnesia = magnesia cement
1: Normal
2: rapid/strong
3: Hot hardening
4: Very rapid/strong
5: Cut off
6: Magnesia To products (pH of 7 to 10 and 11 to 12, respectively and specific gravity of 1.1 to 1.6, respectively) obtained using hydrofluoric acid and sodium fluoride, respectively, in the place of the mineral acid used in Example 8, were added alumina sol in an amount of from 0 to 100% (expressed as calculated solid content) of the solid content of the product, followed by sodium aluminate in an amount of from 0 to 50%, and then applied to a 50μ thick steel foil in a 12μ thickness. After drying, a 2 mm bending test was performed and neither peeling nor cracking was observed. The hardnesses were between 3H to 9H.

EXAMPLES 12

To each of the products (specific gravity 1.25 and pH 12.2) obtained in Examples 6 and 7 were added 20 parts of a mixture of 40 parts of water and 20 parts of I.P.A. and 20 parts of a hydrochloric acid solution (pH 2), and allowed to stand. The supernatant was discarded, and the precipitate had a specific gravity of 1.43 and the yield was 55%. Addition of 95% methanol in 10% in the place of I.P.A. resulted in a yield of 45% (specific gravity 1.46). Addition of ethanol in the place of methanol resulted in a yield of 57% (specific gravity 1.42). A similar yield was obtained by the addition of denatured ethanol.

EXAMPLE 13

A mixture of 100 parts of P-Si-F-Na (viscosity 420 cps) obtained in the previous Examples, 20 parts of kaolin, 40 parts of pozzolan, and 2.5 parts of diatomaceous earth had a viscosity of 1200 cps. The mixture was placed in a dumpling-shape on a 10 mm steel plate. On this, a 12.5 mm alumina silica blanket was pressed and heated to 1200° C. Two hours later, neither peeling nor cracking had occurred. Additionally, the above-mentioned fillers were added to make 100 parts or more, and the viscosity became 200 cps.

EXAMPLE 14

Excess water of water-soluble film-forming inorganic compound, excluding solid content, was used. The excess water and cement were combined in a ratio of from 0.35 to 1 and blended. The blend was applied to a calcium silicate plate to a thickness of 0.5 mm, and the results obtained are summarized in Table 3. In this table, Product Nos. 1 to 8 show the kind of water-soluble film-forming inorganic compounds according to the present invention which were used for this Example.

EXAMPLE 15

The products in Examples 4 to 10 were dried by a spray dryer (Ohgawara Kohki Co., Ltd) at varying inlet temperatures from 200° to 600° C. Substantial spherical particles having sizes between 50 and 100μ were obtained in a yield of 95% or more. Water content was reduced to 2 to 5% of the weights of those products.

EXAMPLE 16

10% PVA solution (20 g) and product No. 4 in Table 3 (20 g) were mixed, and gel was separated. After drying, the gel had a rubber-like elasticity. It could be set on fire with a lighter without flash.

EXAMPLE 17

Glass cloth (100 g/m$^2$) was impregnated with a 5% PVA solution and dried at 70° C., additionally impregnated with product No. 7 in Table 3, squeezed and dried at 120° C. A flexible product was obtained, which was heated with a burner (1000° C.), without being perforated by fusion.

EXAMPLE 18

Kaolin (10 parts) was added to a 10% PVA liquid and applied as a primer to a potassium silicate plate. This was finished with product No. 4 in Table 3 and dried at 100° C. without the occurrence of swelling. A waterproofness test by a cylinder resulted in 0.1 g/cm$^2$.

EXAMPLE 19

A plate (10 cm×20 cm×0.1 cm) of Japanese cedar, Japanese cypress, spruce or lauan was subjected to impregnation with ethylene glycol. After 6 hours of impregnation, the plate was withdrawn, and the gel on the surface was washed off. After drying, the plate was again subjected to impregnation with the blend which was used in No. (1) and Table 3 for 12 hours, withdrawn and dried. The reimpregnated product was heated with a burner (850° C.), resulting in it becoming carbonized without any occurrence of flashover.

EXAMPLE 20

FIG. 1 shows a DTG of the blend which was used in No. 7 in Table 3, which blend exhibits a head absorption peak or dehydration at 170°, 470°, 570° and 670°, and little change in weight throughout the range exceeding 300° C. FIG. 2 schematically shows the DTG.

The before-mentioned Table 1 shows Nos. 1, 2, 7 and 8 of Example 14.

EXAMPLE 21

The blend which was used in No. 1 in Table 3 was applied to a 10 mm thick steel plate and flame-cut without producing the burr which would occur unless coated. The product of product No. 3 in Table 3 was applied to a 10 mm thick stainless steel plate and cut with a laser cutter (Mitsubishi Electric Corp.) with a fireproof effect and without production of a burr, which could not be done unless it was coated.

EXAMPLE 22

As a control, a #28 galvanized steel plate was adhered to a 24 mm gypsum board through hot metal. (This is referred to as "A"). Likewise, the blend which was used in No. 3 in Table 3 was applied to a galvanized sheet plate and a gypsum board and adhered together. (This is referred to as "B"). These composites were heated with a propane burner (850° to 900° C.) while facing the surface of the steel plate to the flame, and the temperatures of the backs of the plates were measured. The results obtained are summarized in Table 4.

TABLE 4

| Minutes | 5 | 10 | 15 | 20 | 25 | 30 |
|---|---|---|---|---|---|---|
| A °C. | 55 | 58 | 60 | 65 | 73 | 78 |
| B °C. | 26 | 28 | 35 | 41 | 41 | 50 |

The gypsum-surface paper of "A" burnt up while that of "B" was carbonized but not damaged, and with a smaller elevation of the temperature of the back of the plates, which demonstrates the improved fireproof and refractory properties of the compounds of the invention.

EXAMPLE 23

The blend which was used in No. 3 in Table 3 was applied to both surfaces of a 3.2 mm thick steel plate to make a composite. This was flame-perforated (850° to 900° C.) with a burner in 200 sec. Another similar steel plate provided on one surface with the coating was flame-perforated in 38 sec., this result being almost the same as for an uncoated similar plate.

EXAMPLE 24

A glass cloth (120 g/m²; Nitto Boseki Co., Ltd.) was impregnated with a mixture of a 10% poval aqueous solution (50 parts) and a 10% sulfamine guanidine solution (50 parts), and dried at 80° C. This was reimpregnated with blend which was used in No. 4 in Table 3 and redried. The thus-obtained product according to the invention having an improved flameproof and refractory property could not be flame-perforated at 1000° C., while untreated glass cloth was easily flame-perforated at 650° C.

Furthermore the product was flexible in a normal state.

EXAMPLE 25

A 80 g/m² paper and a 60 g/m² polyester non-woven fabric were treated with the blends which were used in Nos. 2 and 4 in Table 3, respectively, as in the preceding Example 24. The thus-obtained product according to the invention had an improved flameproof property, and a Meker burner flame-proofness test of it was performed without occurrence of flashover.

EXAMPLE 26

A 50μ stainless steel (manufactured by THYSSEN) and a 25 mm alumina silica blanket (8P) were bonded together by the use of a mixture, as an adhesive, of the blend which was used in No. 3 in Table 3, kaolin (20 parts), pozzolan (35 parts), diatomaceous earth (3 parts) and vermiculite (10 parts) and dried for one day. The composite was spot-adhered with the adhesive to a 10 mm steel plate, and tested for refractory properties in accordance with the standard heating curve (JIS-A1304). The steel plate was heated to a temperature as low as 320° C. A similar result was obtained at a thickness as thin as about 36% of the rock wool product (70 mm). A thickness of 50 mm is necessary with blanket alone. The product was demonstrated to have excellent refractory properties.

Two sheets of 20 mm blanket (8P) were bonded together by the use of the adhesive, and additionally bonded to the above-mentioned 50μ stainless steel. The resulting composite was demonstrated by the refractory property test to allow the temperature of the steel plate to rise to as low as 200° C. Refractory and adhesive properties were provided by fillers in a range of between 0 and 100% and in an addition of between 1 and 200 parts.

EXAMPLE 27

The Japanese cedar sliced paper of 130μ was, for the treatment to make it hard-to-burn, impregnated with a 10% solution of sulfamine or guanidine phosphate and dried. In the concentration range of 1 to 20%, this hard-to-burn property was obtained. The treated paper was bonded to an alumina silica paper with the blend which was used in No. 4 in Table 3. The composite (20 mm × 20 mm) which is called wood paper was tested in accordance with the provisions in Notice No. 1828 of The Japanese Ministry of Construction. The CA (fuming amount) was 11 to 13, and neither residual flame nor cracking was observed. It was demonstrated that there was no increase in calorie, and thus the product was suited for a non-combustible material.

EXAMPLE 28

On a non-combustible material, gypsum board (10 mm thick) of which the surface paper burns with much fuming, the wood paper of Example 7 was bonded with the blend which was used in No. 3 in Table 3. Using the obtained composite, a surface test and a basic material test were performed as prescribed in the Notice No. 1231 of The Japanese Ministry of Construction, and the results obtained were as follows:

Surface test: Ca 23, Dd 0, and residual flame 0.

Basic material test: Temperature difference was only 50° C., which meets the requirements for a non-combustible material.

Thus, Japanese cedar and Japanese cypress can be used as processed materials according to the invention for the interior of very tall buildings.

EXAMPLE 29

Using a 70 g non-woven fabric (Toyobo Co., Ltd.) with a printed pattern instead of Japanese cedar, the same procedure as in Example 27 was carried out. The non-combustible material test as in Examples 27 and 28 was performed, with the result that the material met the requirements for a non-combustible material.

EXAMPLE 30

To the blend which was used in No. 4 in Table 3 were added kaolin (20 parts), pozzolan (30 parts), diatomaceous earth (3 parts) and glycerin (1 part) to make a refractory adhesive. A 50μ stainless steel plate and various materials of 10 mm thick, respectively, were bonded with the adhesive, and a refractoriness test (1000° C., 2 hours) was performed in an electric furnace. Each of glass wool, primary-calcined carbon wool, and rock wool became deteriorated. On the other hand, alumina silica felt, blanket and paper remained as they were. Any paper with pulp added thereto was deteriorated. Taking this into consideration, as a matter of course, refractory materials exposed to temperatures of 1000° C. or above should be made of the present composite.

EXAMPLE 31

To water glass were added at least one selected from the group consisting of aluminum hydroxide, magnesium hydroxide, kaolin, silica fume pozzolan, pyrophyllite, diatomaceous earth, and others, and applied to a 30μ stainless steel foil. Then a test for flexibility was performed. They were hardened and none of them became flexible by addition of glycerin. Heating at 1150° C. for 3 hours caused partial adhesion and produced no cracking. None adhered. Addition of filler was made in the range of 5 to 100%.

In the above-mentioned example, none of the refractory adhesives according to the present invention was affected by peeling and cracking. If the total amount of added fillers exceeds 300% of the solid content of each product in Table 3, a loss of flexibility results.

EXAMPLE 32

A 8P-25 mm thick alumina silica blanket was bonded to a ferrite stainless steel (A) and an austenite stainless (B), respectively, with the refractory adhesive of Example 31 according to the present invention in a rate 250 g/mm$^2$. In accordance with the previous JIS A1302 method, a piece (300 mm × 300 mm) of each composite was further bonded to a 3.2 mm steel plate and heated for 3 hours. Sample (A) was observed to become deteriorated and damaged, and the back reached a temperature of 450° C. or above in 2 hours, before heating was stopped. On the other hand, at the 3rd hour, it was noted in sample (B) that the temperature of the back of the steel plate was 320° C., and the metal foil on the surface remained undamaged. The performance depended on the refractoriness of the metal foil on the surface of the refractory adhesive. With a blanket of 40 mm, a temperature of the back of 200° C. was noted.

EXAMPLE 33

A composite material was obtained by bonding a 8P-25 mm thick alumina silica blanket to an austenite stainless steel with the refractory adhesive of Example 31 according to the present invention in a rate of 250 g/mm$^2$. This composite material was divided into two equal parts. In accordance with the JIS A1302 method, these two parts of composite material were bonded to a 10 m/m steel plate while the cut sections were joined oppositely.

Then a refractory covering tape was obtained by bonding a 2.5 mm paper blanket to an austenite stainless steel with the refractory adhesive of Example 31 according to the present invention at a rate of 250 g/mm$^2$. In accordance with the JIS A1302 method, the 5 cm width of this refractory covering tape was bonded to the before-mentioned composite materials and to the cut slit portion. The cut slit portion of the composite material was covered and coated by the refractory covering tape. Thus, overall, the steel plate was coated by two parts of composite material and by refractory covering tape on the cut slit portion of the composite material.

Figure 4:
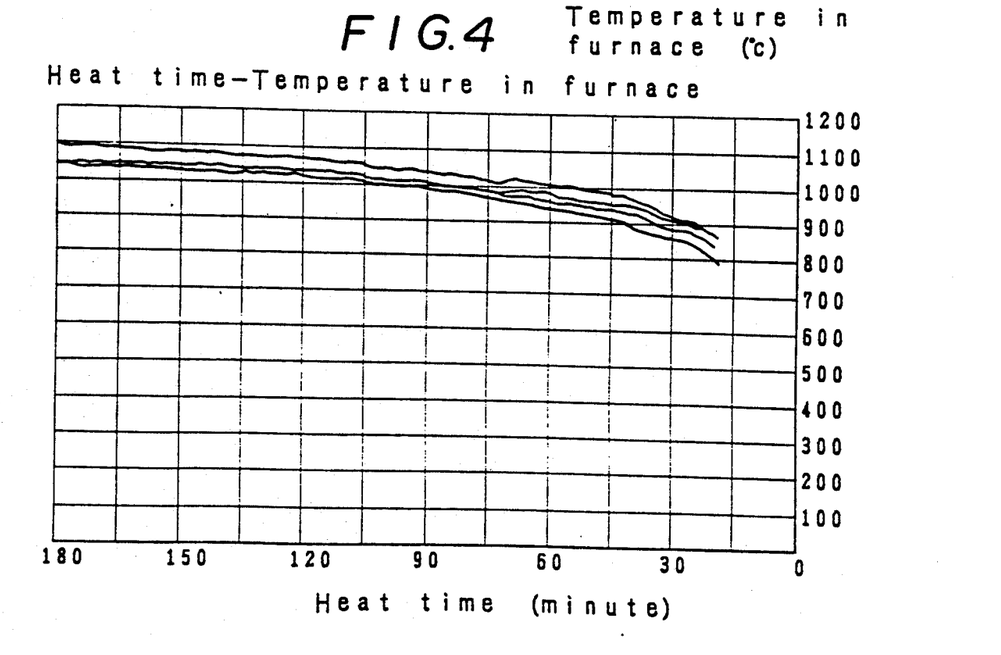
FIG. 4 shows the relationship between furnace temperature and heating time characteristics.
Figure 5:
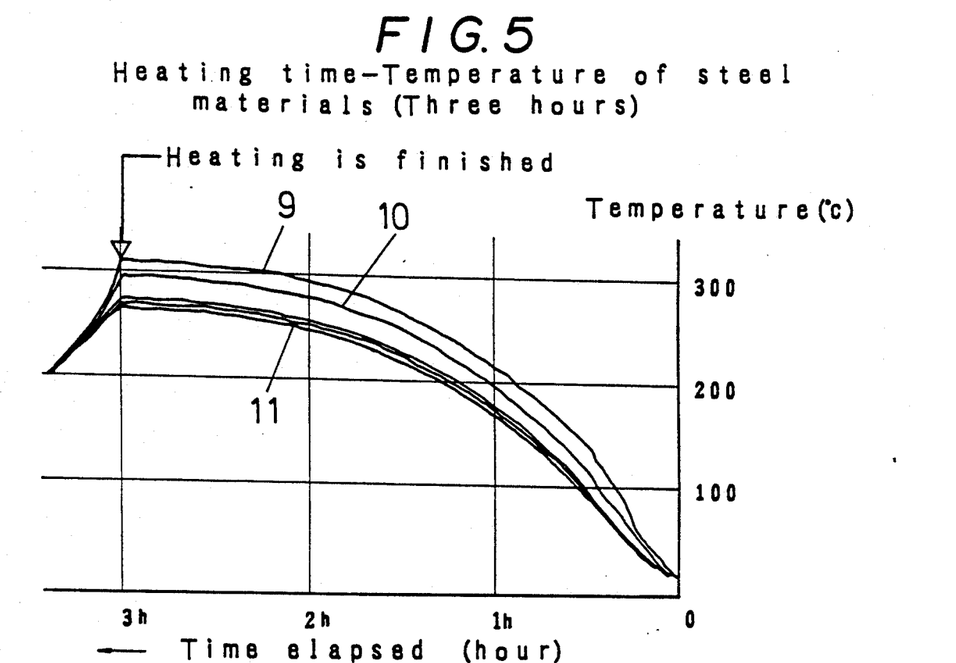
FIG. 5 shows the relationship between the furnace temperature and heating time characteristics of a steel plate.

This was tested for refractoriness by 3 hours heating as in the preceding Example. The back of the steel plate was noted to have a temperature of 310° C. and remained undamaged. In the spot adhesive and the metal foil, peeling and cracking was not at all noted. FIG. 3 shows a standard heating curve, and FIG. 4 shows the temperature of the back of the steel plate.

EXAMPLE 34

A T-shaped pin was inserted into the refractory covering material of the preceding Example according to the present invention and electrodeposited with a stud welder (Nihon Driveit Co., Ltd.) which was accomplished momentarily.

In this method, a refractory covering material according to the invention as thin as up to 30 m/m is easily electrodeposited. If the same ability as obtained by this method could be obtained by the method using a blanket, a 50–60 m/m thin blanket would be required. In the method using a blanket, the longer stud is required than that used in this method, and many more studs are required than those used in this method.

Much adhesive and many processing stages are required if the stainless steel is bonded as the surface post-process.

EXAMPLE 35

To an H-shaped piece of steel (350 × 250 × 9 × 14) on the ground, an adhesive according to the present invention was spot-adhered, the above-mentioned 25 mm refractory covering material was wound in an H-pattern. In some places, a temporary fastening was made with adhesive tape, and T-shaped pins were inserted and electrodeposited very easily. Also, at the joints, the 2.5 mm refractory covering tape was applied and T-shaped pins were electrodeposited. The appearance was beautiful. On the spot, no dust was evolved.

EXAMPLE 36

The H-shaped steel in the preceding Example was wound with a stainless steel strip as a primer and fastened (Futonmaki technique in Japan). Also, mesh was welded and studs were electrodeposited. This work, with the exception of the fine mesh wires, could be performed easily.

In addition, the 2.5 mm refractory covering tape was coiled on as primer, and easily electrodeposited.

Any primer was coated with the refractory adhesive according to the invention, to which the 2.5 mm refractory covering material according to the invention could be adhered easily.

EXAMPLE 37

FIGS. 6 through 9 illustrate the covering process according to the present invention.

Figure 7:
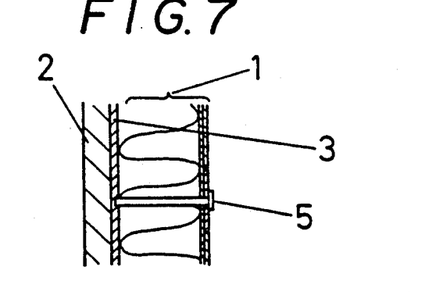
FIG. 7 is a fragmentary cross-sectional view of the vertical part of the steel frame of FIG. 6 on an enlarged scale.

FIG. 7 is an enlarged cross-sectional view illustrative of how a refractory covering material 1 is bonded to a steel frame 2 through the intermediation of an inorganic refractory adhesive 3.

The covering material is fastened with stud pins 5.

The fastening is applied at the end of a steel frame beam additionally to prevent initial peeling of the adhered part.

Figure 6:
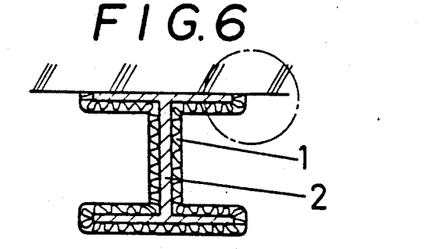
FIG. 6 is a fragmentary cross-sectional view.
Figure 8:
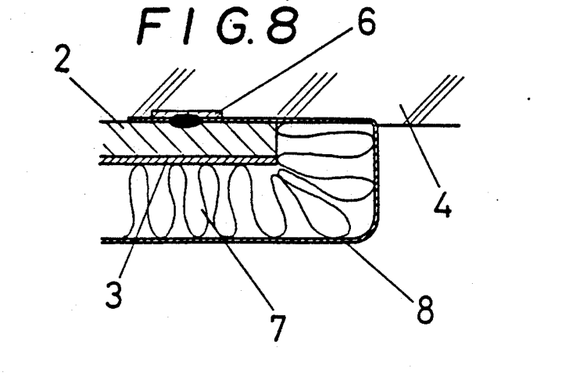
FIG. 8 is a fragmentary cross-sectional view of a part placed in contact with a concrete slab on an enlarged scale.

FIG. 8 is an enlarged cross-sectional view illustrative of how the covering material is engaged with the slab of concrete of FIG. 6 at the upper end portion of the steel frame beam.

The covering material was fastened by spot welding of the metallic foil (stainless steel, 50μ thick) through a metal plate (1 mm thick) as a holder. The reference numeral 4 designates the concrete slab.

Figure 9:
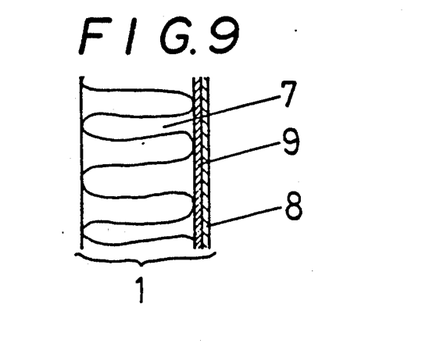
FIG. 9 is a fragmentary cross-sectional view of a refractory covering material according to the invention.

FIG. 9 is a cross-sectional view illustrative of the structure of the refractory covering material according to the invention. Reference characters designate adhesive as 9, heat insulating ceramic fiber material as 7, and 50μ-thick stainless foil as 8.

What is claimed is:

1. A solidified material obtained by spray-drying a water-soluble film-forming inorganic compound at a drier inlet temperature of 150° to 600° C., said water-soluble film-forming inorganic compound having a specific gravity of 1.1 or more and capable of being formed into a film at ordinary temperature or by heating, said compound being formed by a reaction of a metal, hydrofluoric acid or boric acid and their salts or their submineral acid salts, and a hydroxide of an alkali metal, wherein said reaction is performed in water or a solution of said hydrofluoric acid or boric acid and their salts or their submineral acid salts, wherein said metal is silicon in a solid state and reacts with a concentrated solution of said alkali metal hydroxide, and then said hydrofluoric acid or boric acid and their salts or their submineral acid salts takes part in the reaction, wherein the reaction temperature is controlled within a temperature range of 50° C. to 100° C., and wherein said reaction solution has a solid content of 10% or more by weight and a specific gravity of 1.1 or more.

2. A solidified material according to claim 1, wherein a hafnium-containing compound is added in an amount of from 0.5 to 100% by weight to said hydrofluoric acid or boric acid and their salts or their submineral acid salts, and wherein the temperature of the reaction is controlled so as to keep the reaction temperature at 50° C. or above without boiling.

3. A solidified material according to claim 1, wherein said water-soluble film-forming inorganic compound has its structure represented by the formula wherein A is Si; B is FH, $BH_3$ or $B_2O_3$; C is Na, K or Li; D is $H_2O$ or OH; and a, b, c, d, p, q, r and s are each representative of the number of moles of their given component.

4. A solidified material according to any one of claims 1 to 3, wherein said water-soluble film-forming inorganic compound is obtained by adding an excess amount of at least one metal compound containing silicon to said water-soluble film-forming inorganic compound.

5. A solidified material according to any one of claims 1 to 3, wherein said water-soluble film-forming inorganic compound is obtained as a sediment having a specific gravity of 1.3 or more by mixing an alcohol containing or not containing a mineral acid comprising a strong acid with said water-soluble film-forming inorganic compound.

* * * * *